United States Patent
Bae (10) Patent No.: US 9,872,179 B2
(45) Date of Patent: Jan. 16, 2018

(54) METHOD AND APPARATUS FOR CONTROLLING NETWORK ACCESS ACCORDING TO UE CAPABILITY AND SUBSCRIPTION INFORMATION

(71) Applicant: Samsung Electronics Co., Ltd., Gyeonggi-do (KR)

(72) Inventor: Sujin Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 10 days.

(21) Appl. No.: 14/618,506

(22) Filed: Feb. 10, 2015

(65) Prior Publication Data

US 2015/0230094 A1  Aug. 13, 2015

(30) Foreign Application Priority Data

Feb. 10, 2014  (KR) .................. 10-2014-0015147

(51) Int. Cl.
*H04W 12/06* (2009.01)
*H04W 12/08* (2009.01)
*H04W 36/00* (2009.01)
*H04W 48/02* (2009.01)
*H04W 48/18* (2009.01)

(52) U.S. Cl.
CPC ....... *H04W 12/08* (2013.01); *H04W 36/0022* (2013.01); *H04W 48/02* (2013.01); *H04W 48/18* (2013.01)

(58) Field of Classification Search
CPC .................................................... H04W 12/06
USPC .......... 455/434, 507, 511, 517, 435.1, 435.2, 455/436–444, 458; 370/353, 352, 401
See application file for complete search history.

(56) References Cited

U.S. PATENT DOCUMENTS

| | | |
|---|---|---|
| 2008/0069085 A1 | 3/2008 | Song et al. |
| 2009/0285157 A1 | 11/2009 | Yeoum et al. |
| 2010/0329243 A1* | 12/2010 | Buckley ............... H04W 48/18 370/352 |

(Continued)

FOREIGN PATENT DOCUMENTS

| | | |
|---|---|---|
| KR | 1020130127863 | 11/2013 |
| WO | WO 2013/048189 | 4/2013 |

(Continued)

OTHER PUBLICATIONS

International Search Report dated May 11, 2015 issued in counterpart application No. PCT/KR2015/001151.

(Continued)

*Primary Examiner* — Kamran Afshar
*Assistant Examiner* — Farid Seyedvosoghi
(74) *Attorney, Agent, or Firm* — The Farrell Law Firm, P.C.

(57) ABSTRACT

A method and apparatus are provided for controlling network access based on UE capability and subscription information. A method of a Mobility Management Entity (MME) includes receiving, from a User Equipment (UE), a message including voice domain preference information indicating whether the UE prefers an access network for a voice service; determining whether access of the UE to the mobile communication system is allowed based on the voice domain preference information; and transmitting, to the UE, a message indicating whether the access to the mobile communication system is allowed.

14 Claims, 4 Drawing Sheets

(56) References Cited

U.S. PATENT DOCUMENTS

| | | | |
|---|---|---|---|
| 2011/0199962 A1 | 8/2011 | Kahn et al. | |
| 2012/0195261 A1* | 8/2012 | Nishida | H04W 36/0022 370/328 |
| 2013/0203418 A1 | 8/2013 | Jang et al. | |
| 2014/0204901 A1 | 7/2014 | Hedman et al. | |

FOREIGN PATENT DOCUMENTS

| | | |
|---|---|---|
| WO | WO 2013/050061 | 4/2013 |
| WO | WO 2013/119025 | 8/2013 |

OTHER PUBLICATIONS

3rd Generation Partnership Project; Technical Specification Group Services and System Aspects; Architectural Requirements (Release 11), 3GPP Standard, 3GPP TS 23.221 V11.2.0, Jun. 22, 2013, 51 pages.

European Search Report dated Aug. 14, 2017 issued in counterpart application No. 15746926.3-1870, 5 pages.

* cited by examiner

METHOD AND APPARATUS FOR CONTROLLING NETWORK ACCESS ACCORDING TO UE CAPABILITY AND SUBSCRIPTION INFORMATION

PRIORITY

This application claims priority under 35 U.S.C. §119(a) to Korean Patent Application No. 10-2014-0015147, which was filed in the Korean Intellectual Property Office on Feb. 10, 2014, the entire disclosure of which is incorporated herein by reference.

BACKGROUND OF THE INVENTION

1. Field of the Invention

The present invention relates generally to an interworking method between a User Equipment (UE) and a network, and more particularly, to a method and an apparatus for limiting or allowing access of a UE in a packet access network (for example, Long Term Evolution (LIE)) according to conditions such as a specific frequency band and a specific location.

2. Description of the Related Art

A Home Subscriber Server (HSS) stores subscription information on a UE and registers a subscriber in an LTE/Evolved Packet Core (EPC) network. Accordingly, when the UE accesses the LTE/EPC network, the network determines whether the UE can access the network based on whether the network stored in the HSS can be accessed and the subscription information. However, the network determines whether the UE can access the LTE/EPC network regardless of the type and capability of the UE.

Specifically, the access determination of the UE is uniformly applied in all areas regardless of UE type and/or UE capability (for example, Circuit Switched Fall Back (CSFB) UE or Voice over Long Term Evolution (VoLTE). That is, in cases with the same subscriber, whether the UE can access or not is uniformly applied regardless of UE type or UE capability. Consequently, when the same subscriber uses a different UE, for example, when the user inserts its own Subscriber Identity Module (SIM) into a UE of another user, access to the network is determined based on subscription information regardless of the another user's UE capability.

However, in order to efficiently provide frequency, a particular UE type (for example, a CSFB UE) requires a network access control function to limit the access to the network in a particular frequency band and/or location is required. For example, when an operator desires to use a specific LTE frequency band designated for a VoLTE UE, the operator should limit access of the CSFB UE to the network in the corresponding frequency band. However, conventional methods do not provide a network access control function based on a particular frequency/location or a particular UE type/UE capability.

SUMMARY OF THE INVENTION

Accordingly, the present invention has been made to address the above-described problems and to provide at least the advantages described below.

Accordingly, an aspect of the present invention is to provide a method and an apparatus that control access of a UE to a network according to a type and capability of a particular UE for each location of a particular access network and/or each particular frequency.

In accordance with an aspect of the present invention, a method is provided for a Mobility Management Entity (MME) in a mobile communication system. The method includes receiving, from a UE, a message including voice domain preference information indicating whether the UE prefers an access network for a voice service; determining whether access of the UE to the mobile communication system is allowed based on the voice domain preference information; and transmitting, to the UE, a message indicating whether the access to the mobile communication system is allowed.

In accordance with another aspect of the present invention, a method is provided for a UE in a mobile communication system. The method includes transmitting, to an MME, a message including voice domain preference information indicating whether the UE prefers an access network for a voice service; and receiving, from the MME, a message indicating whether access to the mobile communication system is allowed, based on the voice domain preference information.

In accordance with another aspect of the present invention, an MME is provided for use in a mobile communication system. The MME includes a transceiver configured to communicate with another network entity; and a controller configured to control the transceiver to receive, from a UE, a message including voice domain preference information indicating whether the UE prefers an access network for a voice service, to determine whether access of the UE to the mobile communication system is allowed based on the voice domain preference information, and to control the transceiver to transmit, to the UE, a message indicating whether the access of the UE to the mobile communication system is allowed.

In accordance with another aspect of the present invention, a UE is provided for use in a mobile communication system. The UE includes a transceiver configured to communicate with another network entity; and a controller configured to control the transceiver to transmit, to an MME, a message including voice domain preference information indicating whether the UE prefers an access network for a voice service, and to receive, from the MME, a message indicating whether access to the mobile communication system is allowed, based on the voice domain preference information by the MME.

BRIEF DESCRIPTION OF THE DRAWINGS

The above and other aspects, features, and advantages of certain embodiments of the present invention will be more apparent from the following detailed description in conjunction with the accompanying drawings, in which.

DETAILED DESCRIPTION OF EMBODIMENTS OF THE INVENTION

Hereinafter, various embodiments of the present invention will be described with reference to the accompanying drawings. It is noted that, where possible, the same reference numerals are designated to the same components in the accompanying drawings. Further, a detailed description of a known function and configuration which may make the subject matter of the present invention unclear will be omitted. Additionally, terms described herein are defined in consideration of the functions of the present invention, but may vary according to the intention or convention of a user or operator. Therefore, the definitions of the terms should be determined based on the entire content of the specification.

Although various embodiments of the present invention will be described with reference to a radio access network, Long Term Evolution (LTE) corresponding to a core network, and en Evolved Packet Core (EPC) as defined by the 3GPP standard, the present invention is not limited to these specific examples and may be applied to other communication systems having similar technical backgrounds.

Herein, an LTE system is understood as including LTE-Advanced (LTE-A) technology.

Further, herein, a terminal may be fixed or mobile, and may be referred to using other terms, such as a Mobile Station (MS), a Mobile Terminal (MT), a User Terminal (UT), a Subscriber Station (SS), a wireless device, a Personal Digital Assistance (PDA), a wireless modem, a handheld device, a terminal device, a UE, etc.

Figure 1:
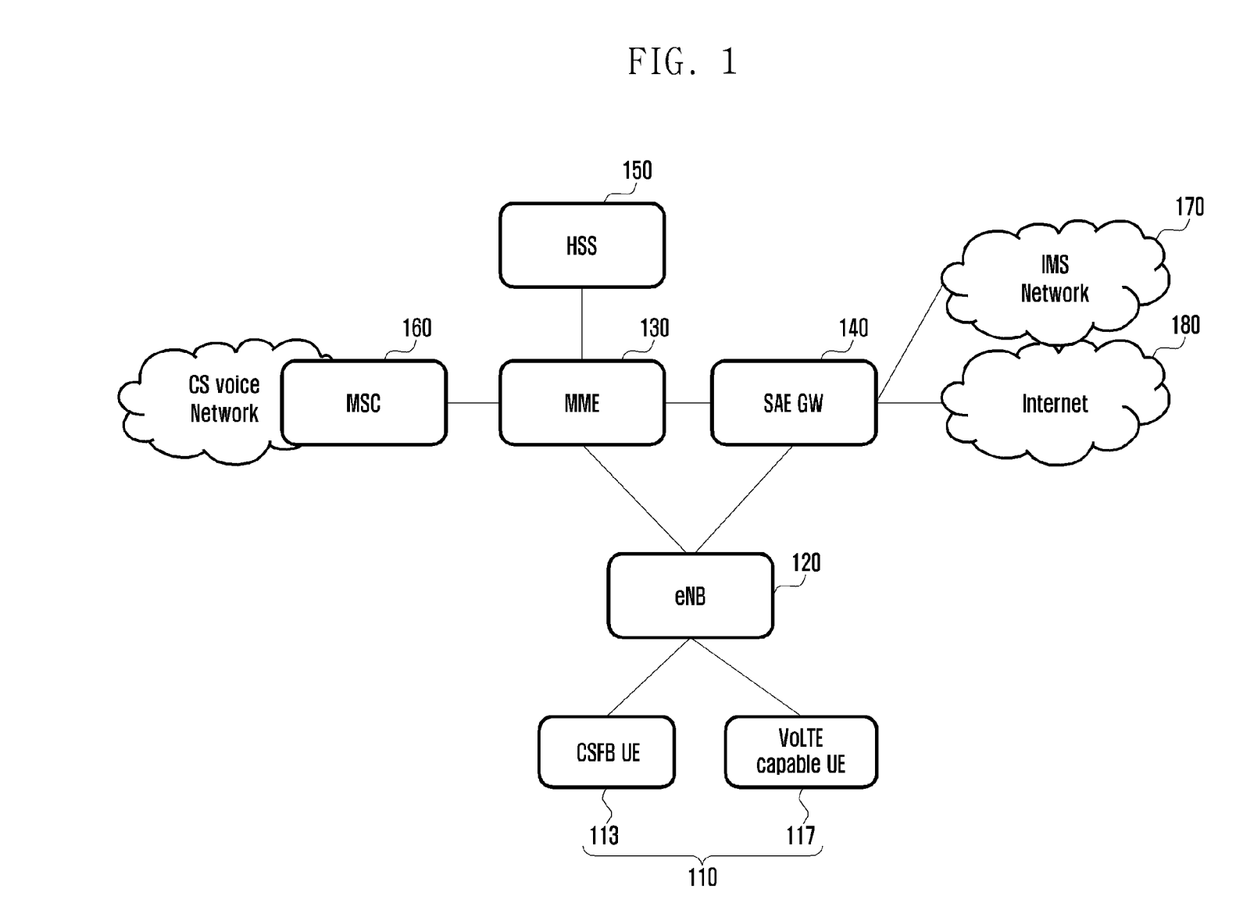
FIG. 1 illustrates a mobile communication system according to an embodiment of the present invention.

FIG. 1 illustrates a mobile communication system according to an embodiment of the present invention.

Referring to FIG. 1, a mobile communication system include UEs 110 (including a CSFB UE 113 and a VoLTE capable UE 117), an evolved Node B (eNB) 120, a Mobility Management Entity (MME) 130, a System Architecture Evolution Gateway (SAE GW) 140, and an HSS 150. Although FIG. 1 illustrates the mobile communication system based on an Evolved Universal Terrestrial Radio Access Network (E-UTRAN), other mobile communication systems may also be used.

The eNB 120 supports, for example, an E-UTRAN (LTE) cell, and provides an interworking function between the CSFB UE 113 and the VoLTE capable UE 117 and an LTE core (i.e., EPC).

The MME 130 controls mobility/session management in an LTE/EPC network.

The SA GW 140 controls Packet Data Network (PDN) interworking and data traffic processing.

The HSS 150 stores a subscriber profile of the LTE network.

The CSFB UE 113 provides a voice service in the LTE network. Particularly, the CSFB UE 113 provides a CSFB-based voice service.

When the CSFB 113 accesses the LTE network, the CSFB UE 113 may inform the MME 130 of at least one of its own voice domain preference information and information related to a UE behavior mode.

The VoLTE capable UE 117 also provides a voice service in the LTE network. Particularly, the VoLTE capable UE 117 provides a VoLTE-based voice service. For example, the VoLTE capable UE 117 may support only VoLTE or may support both VoLTE and CSFB.

When the VoLTE capable UE 117 accesses the LTE network, the VoLTE capable UE 117 may inform the MME 130 of at least one of its own voice domain preference information and information related to a UE behavior mode.

The eNB 120 may support one or more E-UTRAN cells, and provides control plane and user plane data processing between the UEs 110 and the EPC network.

When a subscriber receives a service in the LTE/EPC network, the MME 130 processes the attachment/authentication of the subscriber, processes mobility management, and processes session management. The MME 130 interworks with the HSS 150 to perform the subscriber authentication and profile management processing. Further, the MME 130 may process bearer/mobility management to the SAE GW 140.

The HSS 150 stores LTE network subscription information, subscriber authentication, and profiles. When the UE attaches to the network, the HSS 150 transmits information on a subscriber of the corresponding UE to the MME 130.

The SAE GW 140 may collectively refer to a Serving Gateway (S-GW) and a PDN Gateway (P-GW). The SAE GW 140 may also perform a function of processing user plane data and interworking with an external PDN.

A Mobile Switching Center (MCS)/Circuit Switched (CS) voice network 160 interworks with the MME 130 to provide a CSFB-based voice service.

An Internet network 180 is a data service providing network and is one of the PDNs interworked by the P-GW of the SA GW 140.

An Internet Protocol (IP) Multimedia Subsystem (IMS) network 170 is an IP-based voice network and is one of PDNs interworked by the P-GW of the SA GW 140.

When the UEs 110, i.e., LTE UEs, access a mobile communication network, the UEs 110 may configure voice domain preference information indicating whether an access network for a voice service is preferred. Further, the UEs 110 may configure their own respective usage setting information corresponding to setting information on a UE behavior mode indicating whether a voice service is preferred or a data service is preferred Thereafter, the UEs 110 transmit at least one of the configured voice domain preference information and the usage setting information to the MME 130.

The CSFB UE 113 may configure the voice domain preference information by inserting content indicating that only a CSFB-based voice service is supported into the voice domain preference information. For example, the voice domain preference information may be configured as "CS voice only".

The VoLTE capable UE 117 may configure the voice domain preference information by inserting content indicating that only a VoLTE-based voice service is supported into the voice domain preference information. Alternatively, the VoLTE capable UE 117 may configure the voice domain preference information by inserting content indicating that one of the VoLTE-based voice service and the CSFB-based voice service is preferred into the voice domain preference information.

For example, the VoLTE capable UE 117 may configure the voice domain preference information as "PS voice only" or "IMS only" to indicate supporting of only VoLTE.

Alternatively, when the VoLTE capable UE 117 supports both the VoLTE-based voice service and the CSFB-based voice service, the VoLTE capable UE 117 may configure the voice domain preference information to indicate that one of the VoLTE and CSFB-based voice services is preferred. For example, the voice domain preference information may be configured as "PS preferred" or "IMS preferred".

The VoLTE capable UE 117 may also configure the voice domain preference information to indicate that the CSFB-based voice service is secondarily preferred. For example, the voice domain preference information may be configured as "PS preferred/CS secondary" or "IMS preferred/CSFB secondary". In contrast, when the VoLTE capable UE 117 prefers the CSFB-based voice service, the VoLTE capable UE 117 may configure the voice domain preference information as "CS preferred/PS secondary" or "CS preferred/IMS secondary".

Even when the VoLTE capable UE 117 can support both the VoLTE-based voice service and the CSFB-based voice service, the VoLTE capable UE 117 may configure the voice domain preference information as "PS voice only" or "IMS only" to support only the VoLTE-based voice service. Further, even when the VoLTE capable UE 117 can support both the VoLTE-based voice service and the CSFB-based voice service, the VoLTE capable UE 117 may configure the voice domain preference information as "CS voice only" to support only the CSFB-based voice service.

The UEs 110 may configure their respective usage setting information according to whether the voice service is preferred or the data service is preferred. That is, when the UEs 110 prefer the voice service, the UEs 110 may configure the usage setting information by inserting information indicating that a UE behavior mode prefers the voice service into the UE usage setting information. For example, the UEs 110 may configure the UE's usage setting information as "voice centric".

Alternatively, when the UEs 110 prefer the data service, the UEs 110 may configure the UE usage setting information by inserting information indicating that a UE behavior mode prefers the data service into the UE usage setting information. For example, the UEs 110 may configure the UE usage setting information as "data centric".

As described above, the UEs 110 may transmit at least one of the configured voice domain preference information and UE usage setting information to the MME 130 to control the access of the UEs 110.

The MME 130 provides information management for each corresponding location for a network access limit function of the UEs 110 according to particular location or frequency information.

That is, the MME 130 may limit the access of a corresponding UE with respect to a particular frequency band according to type or capability of the UE. For example, the MME 130 may configure Tracking Area (TA) list information included in an LTE 800 MHz frequency band as a UE access limit interval.

Further, the MME 130 may limit the access of the corresponding UE with respect to a particular location and according to type or capability of the UE. For example, the MME 130 may configure the eNB 120 or TA list information included in a particular location as UE access limit interval.

When an UE attempts access in a configured particular frequency band and/or particular location, the MME 130 determines whether the access of the corresponding UE to the network is limited according to UE capability and UE subscription information. For example, the MME 130 may provide network access limit logic applying information of the corresponding UE according to each UE capability and type.

The MME 130 may also determine whether subscription information of the corresponding UE should be identified, and then identify the subscription information accordingly. For example, the MME 130 may identify whether a subscriber of the corresponding UE is a VoLTE subscriber or a CSGB subscriber through the identification of the subscription information. The MME 130 may identify the subscription information through the subscription information of the subscriber received from the HSS 150.

For example, when the subscription information is an IMS Access Point Name (APN), the MME 130 may determine the user as the VoLTE subscriber. Alternatively, when the subscription information is a particular APN, the MME 130 may determine the user as the CSFB subscriber. When the subscription information is another particular APN, the MME 130 may determine the user as the VoLTE subscriber As another example, when a Radio Access Technology (RAT)/Frequency Selection Priority (RFSP) of the subscription information is a particular value, the MME 130 may determine the user as the CSFB subscriber. When the RASP is another particular value, the MME 130 may determine the user as the VoLTE subscriber. Whether a subscriber of the corresponding UE is a CSFB subscriber or a VoLTE subscriber through subscription information may vary depending on a setting by an operator.

As described above, the MME 130 may receive at least one of the voice domain preference information and the UE usage setting information from the UEs 110, and then determine whether to limit the access of the corresponding UE according to the received information.

More specifically, the MME 130 may identify the voice domain preference information received from the UEs 110. That is, when the voice domain preference information includes information indicating that only the CSFB-based voice service is supported, the MME 130 may determine the corresponding UE as the CSFB UE 113. For example, when the received voice domain preference information is "CS voice only", the MME 130 may determine the corresponding UE as the CSFB UE 113.

Alternatively, when the voice domain preference information includes information indicating that only the VoLTE-based voice service is supported, the MME 130 may determine the corresponding UE as the VoLTE UE 117. For example, when the received voice domain preference information corresponds to at least one of "PS voice only" (or "IMS only"), "PS preferred/CS secondary" (or "IMS preferred/CSFB secondary"), and "CS preferred/PS secondary" (or "CS preferred/IMS secondary"), the MME 130 may determine the corresponding UE as the VoLTE capable UE 117.

Further, the MME 130 may identify the UE usage setting information received from the UEs 110. That is, when the UE usage setting information includes information indicating that the voice service is preferred, the MME 130 may determine the corresponding UE as a UE preferring the voice service. For example, when the received UE usage setting information corresponds to "voice centric", the MME 130 may determine the corresponding UE as preferring the voice service.

Alternatively, when the UE usage setting information includes information indicating that the data service is preferred, the MME 130 may determine the corresponding UE as preferring the data service. For example, when the received UE usage setting information corresponds to "data centric", the MME 130 determines the corresponding UE as preferring the data service.

Thereafter, the MME 130 may determine capability of the corresponding UE according to at least one of the voice domain preference information and UE usage setting information received from the UEs 110 to determine whether to limit the access of the corresponding UE.

For example, when the UE is the VoLTE UE with respect to a particular frequency band, the MME 130 may allow the access and may not provide the CSFB-based voice service.

In this case, the MME 130 may determine whether to allow access of the corresponding UE according to the received voice domain preference information. That is, when the voice domain preference information is configured as "CS voice only", and thus, the corresponding UE supports only the CSFB-based voice service, the MME 130 may limit access of the corresponding CSFB UE 113 to the network in the particular frequency band.

Further, when the received voice domain preference information corresponds to "PS voice only" (or "IMS only"), the corresponding UE is the VoLTE capable UE 117 that supports only the VoLTE-based voice service, and the MME 130 may allow the access of the VoLTE capable UE 117 to the network in the particular frequency band.

Alternatively, when the received voice domain preference information corresponds to "PS preferred/CS secondary" (or "IMS preferred/CSFB secondary") or "CS preferred/PS secondary" (or "CS preferred/IMS secondary"), the corresponding UE is the VoLTE capable UE 117 that supports the VoLTE-based voice service, and the MME 130 may allow access of the VoLTE capable UE 117 to the network in the particular frequency band.

The MME 130 may transmit, to the UEs 110, information indicating that the corresponding particular frequency band corresponds to an area to which the CSFB-based voice service is not provided. For example, the MME 130 may transmit, to the UEs 110, EPS only accept information, a cause thereof (CS domain not available), and information indicating the IMS voice service is possible. Thereafter, the UEs 110 may attempt to use the service through VoLTE using the above information.

Access of the VoLTE capable UE 117 is allowed in a particular frequency band. When CSFB-based voice service is not provided, even the CSFB UE 113 that supports only the CSFB-based voice service is allowed access in the corresponding TA according to a particular condition. For example, even when the CSFB UE 113 attempts access in a TA area supporting only the VoLTE service, an operator may configure to allow the access of the CSFB UE 113 according to traffic amounts in the corresponding TA area and the UE usage setting information.

Alternatively, the operator may configure to limit the access of the VoLTE capable UE 117 according to traffic amounts in the corresponding TA area and the UE usage setting information in spite of the VoLTE capable UE 117. That is, whether to limit the access to the network according to the UE capability may change depending on a necessity of the operator.

The HSS 150 may transmit subscription information to the MME 130 to allow the MME 130 to identify whether a user of the corresponding UE is a VoLTE subscriber or a CSFB subscriber. That is, in order to allow the MME 130 to provide UE access control logic, the HSS 150 may store subscription information and transmit the stored subscription information to the MME 130.

For example, when the user is the VoLTE subscriber, the subscription information may be provided as the IMS APN. Alternatively, when the user is the CSFB subscriber, the subscription information may correspond to a particular APN.

When the user is the VoLTE subscriber, the subscription information may be provided as another particular APN. In another example, when the user is the CSFB subscriber, the subscription information may be provided as a particular value of RFSP. When the user is the VoLTE subscriber, the subscription information may be provided as another particular value of the RFSP.

Figure 2:
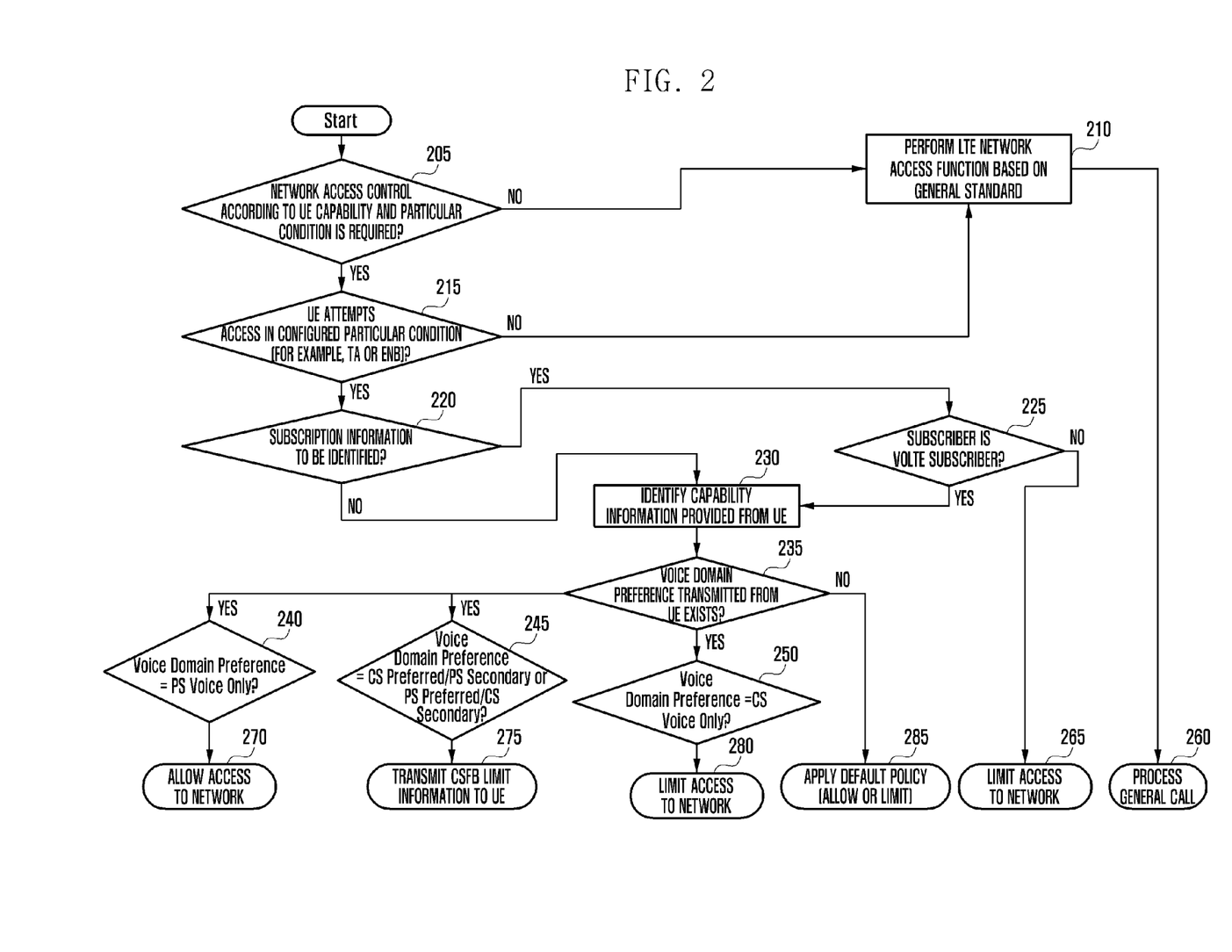
FIG. 2 is a flowchart illustrating a UE access control process of an MME according to an embodiment of the present invention.

FIG. 2 is a flowchart illustrating a UE access control process of the MME according to an embodiment of the present invention. Specifically, FIG. 2 illustrates an example in which the MME 130 allows access of the VoLTE capable UE 117 according to each particular frequency/location and limits access of the CSFB UE 113 supporting the CSFB-based voice service according to each particular frequency/location.

Referring to FIG. 2, the MME 130 controls the access of a corresponding subscriber/UE to the network according to each particular condition (for example, each particular frequency band or each particular location) using subscription information of the subscriber provided by the HSS 150 and capability information transmitted by the UE. For example, in the corresponding frequency band/TA, only the VoLTE capable UE 117 is allowed to access the network and a VoLTE incapable UE is not allowed to access the network.

In step 205, the MME 130 determines whether to apply the network access control function according to a capability of the UE 110 and/or a particular condition.

When the network access control function according to the capability of the UE 110 and/or the particular condition is not to be applied, the MME 130 performs an LTE network access function (for example, attach or TAU) based on a general standard in step 210. In step 260, the MME 130 performs a general call processing procedure in step 260.

However, when the network access control function according to the capability of the UE 110 and/or the particular condition is to be applied, the MME 130 determines whether the UE 110 attempts to access the network in the particular condition (for example, a TA corresponding to a particular frequency, or a TA or eNB corresponding to a particular location) configured to control the access of the UE to the network in step 215.

When the UE 110 does not attempt to access the network in the particular condition configured to control the access of the UE to the network, the MME 130 perform the LTE network access function (for example, attach or TAU) based on the general standard in step 210 and performs the general call processing procedure in step 260.

However, when the UE 110 attempts to access the network in the particular condition configured to control the access of the UE to the network, the MME 130 may perform the network access control function according to UE capability information. For example, when TA information in an LTE 800 MHz band corresponding to the particular condition and the UE 110 attempts the network access in the corresponding TA, the MME 130 may perform the network access control function according to capability information of the UE 110.

In some embodiments, the MME 130 may perform the network access control function of the UE 110 by further using subscription information of the subscriber.

In step 220, the MME 130 determines whether the subscription information of the subscriber should be identified.

When it is determined that the subscription information of the subscriber does not need to be identified, the MME 130 identifies capability information of the UE 110 in step 230.

However, when it is determined that the subscription information of the subscriber should be identified in step 220, the MME 130 identifies the subscription information received from the HSS 150 in step 225. Specifically, the MME 130 determines whether, for example, the subscriber is the VoLTE subscriber in step 225. For example, the MME 130 may identify whether the subscriber is the VoLTE subscriber by using information such as APN or RFSP index.

When the subscriber is not the VoLTE subscriber, the MME 130 limits access of the UE 110 to the network in step 265.

Alternatively, an operator may determine whether to limit the access to the network according to capability of the corresponding UE as necessary, without unconditionally liming access to the network in step 265, even though the subscriber is not the VoLTE subscriber. For example, when the subscriber is not the VoLTE subscriber but the UE 110 can support the VoLTE-based voice service, the access to the network may be allowed according to capability of the UE 110.

When it is determined that the subscriber is the VoLTE subscriber in step 225, the MME 130 identifies capability information of the UE 110 received from the UE 110 in step 230.

In step 235, the MME 130 determines whether voice domain preference information is inserted into the capability information of the UE 110.

When the voice domain preference information is not inserted into the capability information of the UE 110, the MME 130 applies a predefined default policy in step 285. For example, the MME 130 may allow access of all UEs 110 to the network or limit the access of all UEs 110 to the network.

However, when the MME determines that the voice domain preference information is inserted into the capability information of the UE 110 in step 235, the MME 130 may limit the access of the UE to the network according to steps 240, 245, or 250, based on the voice domain preference information.

More specifically, when it is determined that the voice domain preference information includes information indicating that only VoLTE is supported, for example, "PS voice only" (or "IMS only") in step 240, the MME 130 allows the access of the corresponding UE 110 to the network in step 270. That is, because the UE 110 attempts access in the particular condition (for example, TA information of the LTE 800 MHz band) and the VoLTE capable UE 117 should be allowed to access the network in the corresponding condition, the MME 130 may allow access of the corresponding VoLTE capable UE 117 to the network. At this time, for example, the MME 130 may allow access of the UE 110 to the network by transmitting an attach accept message to the UE 110.

Further, it is determined that the voice domain preference information includes information indicating the VoLTE-based voice service is preferred or the CSFB-based voice service is preferred, for example, "PS preferred/CS secondary" (or "IMS preferred/CSFB secondary") or "CS preferred/PS secondary" (or "CS preferred/IMS secondary"), in step 245, the MME 130 allows access of the corresponding UE 110 to the network in step 275. Because the corresponding TA is an area in which the CSFB service is not provided, the MME 130 may inform the UE 110 of information indicating that the CSFB service is limited. For example, the MME 130 may transmit, to the UE 110, EPS only accept information, a cause thereof (CS domain not available), and information indicating the IMS voice service is possible. Thereafter, the UE 110 may attempt the service through VoLTE by using the above information.

That is, the voice domain preference information corresponds to "PS preferred/CS secondary", the MME 130 may transmit a message to the UE 110 indicating that the access of the UE 110 is allowed. The MME 130 may not inform the UE 110 of information indicating that the CSFB service is limited in the TA. However, the voice domain preference information corresponds to "CS preferred/PS secondary", the MME 130 may first transmit the information indicating that the CSFB service is limited in the TA to the UE 110. Further, the MME 130 may allow the UE 110 to receive the VoLTE service according to the received voice domain preference information.

When it is determined that the voice domain preference information includes information indicating that only CSFB-based voice service is supported, for example, "CS voice only", in step 250, the MME 130 limits the access of the corresponding UE 110 to the network in step 280. Because the UE 110 attempts access in the particular condition (for example, TA information of the LTE 800 MHz band) and the CSFB UE 113 should be allowed to access the network in the corresponding condition, the MME 130 may limit the access of the corresponding CSFB UE 113 to the network. For example, the MME 130 may inform the UE 110 that access to the network is limited by transmitting an attach reject (#12 (Tracking area not allowed)) message to the UE 110. Thereafter, the UE 110 does not attempt access to the network in the corresponding TA.

Although the determination of whether to allow the access of the UE to the network is based on the voice domain preference information in FIG. 2, the present invention is not limited thereto. For example, the operator may change whether to allow the access of the UE to the network according to the voice domain preference information. That is, as described in the illustrated embodiment, when the access of the VoLTE capable UE 117 is allowed according to each particular frequency/location and the access of the CSFB UE 113 supporting only the CSFB-based voice service is limited according to each particular frequency/location, the operator may make a change such that access of the CSFB UE 113 is allowed according to traffic amounts in the corresponding TA and UE usage setting information.

Further, although not illustrated, the MME 130 may determine whether to allow access of the UE 110 to the network by using the UE usage setting information received from the UE 110. For example, when the UE usage setting information indicates that the UE 110 prefers the voice service, the MME 130 may determine to allow or not allow access to the network.

Alternatively, the MME 130 may determine whether to allow access of the UE 110 to the network by using the UE usage setting information and the voice domain preference information. For example, although FIG. 2 illustrates the voice domain preference information including information indicating that only VoLTE is supported, for example, "PS voice only" (or "IMS only"), the MME 130 may allow or not allow access of the UE 110 to the network when the UE usage setting information indicates that the voice service is preferred.

Figure 3:
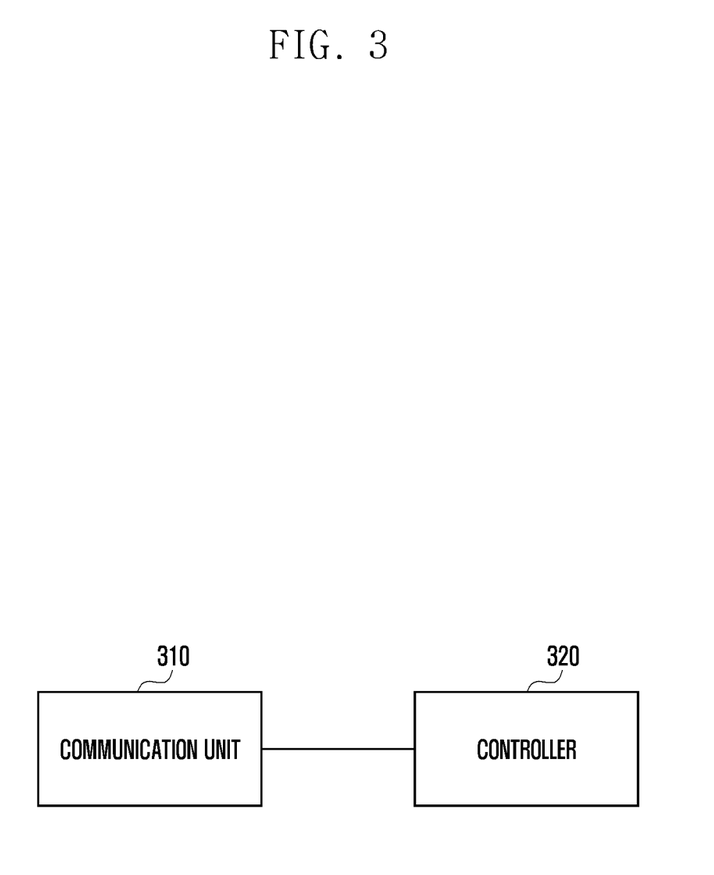
FIG. 3 is a block diagram illustrating a UE according to an embodiment of the present invention.

FIG. 3 is a block diagram illustrating a UE according to an embodiment of the present invention.

Referring to FIG. 3, the UE includes a communication unit 310 and a controller 320. The controller 320 controls the UE to perform any operation described in the aforementioned embodiments. For example, the controller 320 may control the UE to transmit a message including voice domain preference information indicating whether the UE prefers an access network for a voice service to the MME 130 and to receive a message indicating whether the MME 130 allows the access to the mobile communication system determined using the voice domain preference information from the MME 130.

Further, the communication unit 310, e.g., a transceiver, transmits and receives signals according to any operation described in the aforementioned embodiments. For example, the communication unit 310 may transmit a message including the voice domain preference information indicating whether the UE prefers the access network for the voice service to the MME 130.

Figure 4:
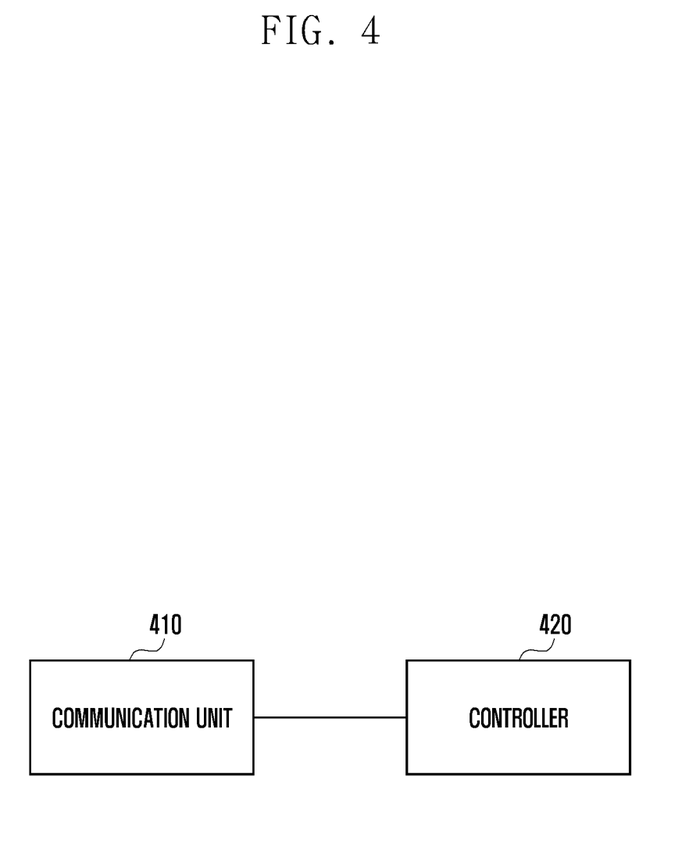
FIG. 4 is a block diagram illustrating an MME according to an embodiment of the present invention.

FIG. 4 is a block diagram illustrating an MME according to an embodiment of the present invention.

Referring to FIG. 4, the MME includes a communication unit 410 and a controller 420. The controller 420 controls the MME to perform any operation described in the aforementioned embodiments. For example, the controller 420 may control the MME to receive a message including voice domain preference information indicating whether the UE prefers an access network for a voice service, to determine whether access of the UE to a mobile communication system is allowed using the voice domain preference information, and to transmit a message indicating whether access to the mobile communication system is allowed to the UE.

Further, the communication unit 410, e.g., a transceiver, transmits and receives signals according to any operation described in the aforementioned embodiments. For example, the communication unit 410 may receive, from the UE, a message including the voice domain preference information indicating whether the UE prefers the access network for the voice service. Further, the communication unit 410 may transmit a message to the UE indicating whether the access of the UE to the network is allowed which is determined by the controller 420.

In the above-described embodiments, all steps and messages may be selectively performed or may be omitted. Further, steps in each embodiment do not have to be sequentially performed and orders thereof may be changed. Transmissions of the messages do not have to be sequentially performed and orders thereof may be changed.

Further, in the above-described embodiments, the MME 130 receives information on UE capability from the UE and then determines whether to limit access of the UE 110 to the network according to the received information. However, the present invention is not limited thereto, and a determination as to whether to limit access of the UE to the network may be performed by a different network entity other than the MME 130.

The embodiments of the present invention shown and described in this specification and the drawings correspond to specific examples presented in order to easily explain technical contents of the present invention, and to help comprehension of the present invention, but are not intended to limit the scope of the present invention. That is, it is obvious to those skilled in the art to which the present invention belongs that different modifications can be achieved based on the technical spirit of the present invention.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of a Mobility Management Entity (MME) in a mobile communication system, the method comprising:
   receiving, at the MME, from a User Equipment (UE), a message including voice domain preference information indicating an access network that is preferred by the UE for a voice service;
   determining, by the MME, whether a user of the UE is a Voice over Long Term Evolution (VoLTE) subscriber;
   determining, by the MME, whether access of the UE to the mobile communication system is allowed based on the voice domain preference information and whether the user is a VoLTE subscriber; and
   transmitting, to the UE, a message indicating whether the access to the mobile communication system is allowed,
   wherein access to the mobile communication system is allowed if the voice domain preference information indicates that only VoLTE is supported by the UE and if the user of the UE is the VoLTE subscriber.

2. The method of claim 1, wherein determining whether the access of the UE to the mobile communication system is allowed comprises:
   identifying subscription information; and
   determining whether the access of the UE to the mobile communication system is allowed by using the subscription information and the voice domain preference information.

3. The method of claim 2, wherein determining whether the access of the UE to the mobile communication system is allowed comprises, when the subscription information includes information indicating that a subscriber is a VoLTE subscriber, determining whether the access of the UE to the mobile communication system is allowed by using the voice domain preference information.

4. The method of claim 2, further comprising:
   identifying the subscription information; and
   receiving the subscription information from a Home Subscriber Server (HSS).

5. The method of claim 1, wherein determining whether the access of the UE to the mobile communication system is allowed comprises:
   receiving, from the UE, UE usage setting information including information indicating whether the UE prefers the voice service or a data service; and
   determining whether the access of the UE to the mobile communication system is allowed by using the UE usage setting information and the voice domain preference information.

6. The method of claim 1, wherein determining whether the access of the UE to the mobile communication system is allowed comprises, when the voice domain preference information includes information indicating that only a Circuit Switched Fall Back (CSFB)-based voice service is supported, determining not to allow the access of the UE to the network.

7. The method of claim 1, wherein determining whether the access of the UE to the mobile communication system is allowed further comprises, when the voice domain preference information includes information indicating that a Circuit Switched Fall Back (CSFB)-based voice service is primarily preferred and that a VoLTE-based voice service is secondarily preferred, transmitting information indicating that the access to the network through the CSFB-based voice service is not possible to the UE.

8. A Mobility Management Entity (MME) for use in a mobile communication system, the MME comprising:
   a transceiver configured to communicate with another network entity; and
   a controller configured to control the transceiver to receive, from a User Equipment (UE), a message including voice domain preference information indicating an access network that is preferred by the UE for a voice service, to determine whether a user of the UE is a Voice over Long Term Evolution (VoLTE) subscriber, to determine whether access of the UE to the mobile communication system is allowed based on the voice domain preference information and whether the user is a VoLTE subscriber, and to control the transceiver to transmit, to the UE, a message indicating whether the access of the UE to the mobile communication system is allowed, wherein access to the mobile communication system is allowed if the voice domain preference information indicates that only VoLTE is supported by the UE and if the user of the UE is the VoLTE subscriber.

9. The MME of claim 8, wherein controller is further configured to identify subscription information and to determine whether the access of the UE to the mobile communication system by using the subscription information and the voice domain preference information.

10. The MME of claim 9, wherein, when the subscription information includes information indicates that a subscriber is a VoLTE subscriber, the controller determines whether the access of the UE to the mobile communication system is allowed by using the voice domain preference information.

11. The MME of claim 9, wherein the controller is further configured to control the transceiver to receive the subscription information from a Home Subscriber Server (HSS).

12. The MME of claim 8, wherein the controller is further configured to control the transceiver to receive UE usage setting information including information indicating whether the UE prefers the voice service or a data service from the UE, and to determine whether the access of the UE to the mobile communication system is allowed by using the UE usage setting information and the voice domain preference information.

13. The MME of claim 8, wherein, when the voice domain preference information includes information indicating that only a Circuit Switched Fall Back (CSFB)-based voice service is supported, the controller determines not to allow the access of the UE to the network.

14. The MME of claim 8, wherein, when the voice domain preference information includes information indicating that a Circuit Switched Fall Back (CSFB)-based voice service is primarily preferred and the a VoLTE-based voice service is secondarily preferred, the controller controls the transceiver to transmit information indicating that the access to the network through the CSFB-based voice service is not possible to the UE.

* * * * *